US011418589B1

(12) United States Patent
Spiegelman

(10) Patent No.: US 11,418,589 B1
(45) Date of Patent: Aug. 16, 2022

(54) OBJECT SYNCHRONIZATION OF SERVER NODES IN A NETWORK COMPUTING ENVIRONMENT

(71) Applicant: EMC IP Holding Company LLC, Hopkinton, MA (US)

(72) Inventor: Roman Spiegelman, Yokneam Illit (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/232,203

(22) Filed: Apr. 16, 2021

(51) Int. Cl.
*H04L 67/1095* (2022.01)
(52) U.S. Cl.
CPC .............................. *H04L 67/1095* (2013.01)
(58) Field of Classification Search
CPC . H04L 67/1095; H04L 67/10; H04L 67/1097; H04L 41/046; H04L 65/1013; H04L 67/025; G06F 8/60; G06F 9/46
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |
| 8,843,676 B2 | 9/2014 | Rajamanickam et al. |
| 9,372,751 B2 | 6/2016 | McNutt |
| 9,514,014 B2 | 12/2016 | Webman et al. |
| 9,892,045 B1 | 2/2018 | Douglis et al. |

(Continued)

FOREIGN PATENT DOCUMENTS

| | | |
|---|---|---|
| WO | PCT/US2019/024885 | 1/2020 |
| WO | PCT/US2019/024900 | 1/2020 |

(Continued)

OTHER PUBLICATIONS

Hong et al., "A Self-Organizing Storage Cluster for Parallel Data-Intensive Applications", Jan. 1, 2004, IEEE, SC '04: Proceedings of the 2004 ACM/IEEE Conference on Supercomputing, pp. 1-12 (Year: 2004).*

(Continued)

*Primary Examiner* — Davoud A Zand
(74) *Attorney, Agent, or Firm* — Ryan, Mason & Lewis, LLP

(57) ABSTRACT

A management server modifies a set of objects which is utilized by the management server to manage a network computing environment including server node. The management server updates a set of container objects in response to modifying the set of objects. Each container object includes attributes to specify a unique identifier of the container object, to specify an update generation number of the container object, and to specify a unique identifier of an object that is associated with the container object. An object synchronization process is performed using the updated set of container objects. The object synchronization process includes identifying each container object having update generation number which is greater than a last update generation number of the given server node, and sending the identified container objects to the given server node to update the set of local objects of the given server node based on the identified container objects.

20 Claims, 8 Drawing Sheets

(56) References Cited

U.S. PATENT DOCUMENTS

| | | | |
|---|---|---|---|
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,454,754 | B1* | 10/2019 | Patel ................... H04L 67/1095 |
| 11,157,331 | B1* | 10/2021 | Wier ................... G06Q 10/0833 |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2012/0079471 | A1* | 3/2012 | Vidal ........................ G06F 8/65 717/169 |
| 2013/0305002 | A1 | 11/2013 | Hallak et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |
| 2020/0036789 | A1* | 1/2020 | Mehta ..................... G06F 16/27 |
| 2020/0089198 | A1* | 3/2020 | Gould ....................... G06F 8/38 |
| 2020/0133937 | A1* | 4/2020 | Cruanes .................. G06F 16/24 |
| 2020/0220926 | A1* | 7/2020 | Herbert ................. H04L 67/025 |

FOREIGN PATENT DOCUMENTS

| | | | |
|---|---|---|---|
| WO | 2020204880 | A1 | 10/2020 |
| WO | 2020204882 | A1 | 10/2020 |

OTHER PUBLICATIONS

Dell EMC, "Dell EMC VxRack FLEX," Dell EMC Product Overview, 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," HPCA, 10.1109/2006. 1598129, pp. 200-211.

Wikipedia, "Raft (Computer Science)," https://en.wikipedia.org/wiki/Raft_(computer_science), Feb. 10, 2020, 4 pages.

Wikipedia, "Paxos (ComputerScience)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

U.S. Appl. No. 16/807,709 filed in the name of Avi Puder et al. on Mar. 3, 2020, and entitled "Management of Shared Resources in a Software-Defined Storage Environment."

U.S. Appl. No. 16/822,818 filed in the name of Itay Keller et al. on Mar. 18, 2020, and entitled "Storage System Implementing Snapshot Longevity Ranking for Efficient Management of Snapshots."

U.S. Appl. No. 16/822,848 filed in the name of Itay Keller et al. on Mar. 18, 2020, and entitled "Assignment of Longevity Ranking Values of Storage Volume Snapshots Based on Snapshot Policies."

U.S. Appl. No. 16/823,813 filed in the name of Itay Keller et al. on Mar. 19, 2020, and entitled "Managing Incompressible Data in a Compression-Enabled Log-Structured Array Storage System."

U.S. Appl. No. 16/830,469 filed in the name of Roi Tagar et al. on Mar. 26, 2020, and entitled "Storage Block Balancing Using Volume Part Migration."

U.S. Appl. No. 16/830,473 filed in the name of Yugal Peleg Lieblich et al. on Mar. 26, 2020, and entitled "Replicated State Cluster with Standby Node State Assessment During Leadership Transition."

U.S. Appl. No. 16/830,946 filed in the name of Gil Ben Zeev et al. on Mar. 26, 2020, and entitled "Storage Volume Migration Scheduling Based on Storage Volume Priorities and Specified Constraints."

U.S. Appl. No. 16/832,763 filed in the name of Michal Yarimi et al. on Mar. 27, 2020, and entitled "Managing Storage Device Errors During Processing of Inflight Input/Output Requests."

U.S. Appl. No. 16/834,363 filed in the name of Itay Keller et al. on Mar. 30, 2020, and entitled "Managing Least Recently Used Cache Using Reduced Memory Footprint Sequence Container."

U.S. Appl. No. 16/836,824 filed in the name of Itay Keller et al. on Mar. 31, 2020, and entitled "Management of Volume Snapshots in a Data Storage System."

U.S. Appl. No. 16/888,742 filed in the name of Rivka Matosevich et al. on May 31, 2020, and entitled "Balancing Resiliency and Performance by Selective Use of Degraded Writes and Spare Capacity in Storage Systems."

U.S. Appl. No. 16/918,654 filed in the name of Rivka Matosevich et al. on Jul. 1, 2020, and entitled "Sharing Memory Resources Between Asynchronous Replication Workloads."

U.S. Appl. No. 16/983,423 filed in the name of Dan Aharoni et al. on Aug. 3, 2020, and entitled "Deferred Reclamation of Invalidated Entries that are Associated with a Transaction Log in a Log-Structured Array."

U.S. Appl. No. 17/024,912 filed in the name of Anurag Sharma et al. on Sep. 18, 2020, and entitled "Automatic Discovery and Configuration of Server Nodes."

U.S. Appl. No. 17/065,754 filed in the name of Dan Aharoni et al. on Oct. 8, 2020, and entitled "Direct Response to IO Request in Storage System with Remote Replication."

U.S. Appl. No. 17/070,073 filed in the name of Dan Aharoni et al. on Oct. 14, 2020, and entitled "Direct Response to IO Request in Storage System Having an Intermediary Target Apparatus."

U.S. Appl. No. 17/070,288 filed in the name of Anurag Sharma et al. on Oct. 14, 2020, and entitled "Pipeline-Based System for Configuration Checking and Reporting Associated with an Information Processing System."

U.S. Appl. No. 17/071,407 filed in the name of John Moran et al. on Oct. 15, 2020, and entitled "Dynamic Remediation Actions in Response to Configuration Checks in an Information Processing System."

U.S. Appl. No. 17/077,105 filed in the name of Yosef Shatsky et al. on Oct. 22, 2020, and entitled "Volume Tiering in Storage Systems."

U.S. Appl. No. 17/106,988 filed in the name of Rivka Matosevich et al. on Nov. 30, 2020, and entitled "Managing Host Connectivity to a Data Storage System."

U.S. Appl. No. 17/123,525 filed in the name of Itay Keller et al. on Dec. 16, 2020, and entitled "Deferred Reclamation of Invalidated Entries Associated qith Replication in a Log-Structured Array."

U.S. Appl. No. 17/145,646 filed in the name of Yosef Shatsky et al. on Jan. 11, 2021, and entitled "Redistribution of Processing Groups between Server Nodes Based on Hardware Resource Utilization."

\* cited by examiner

100

SORTED LIST
400

OBJECT SYNCHRONIZATION OF SERVER NODES IN A NETWORK COMPUTING ENVIRONMENT

TECHNICAL FIELD

This disclosure relates generally to techniques for managing objects in a network computing environment such as a distributed storage environment.

BACKGROUND

In a network computing environment (e.g., a distributed storage environment) with multiple server nodes (e.g., management server nodes, storage server nodes, etc.), there is typically a large number of objects that need to be synchronized between the server nodes. For example, as a management server node creates, updates, and deletes objects, the current state of all objects will change over time. The management server node must synchronize the latest state of all objects to all server nodes in the network computing environment. There are instances, however, when a given server node fails or is otherwise unavailable for a period of time, and the management server node is unable to communicate with the given server node. When the given server node comes back up, the local object state of the given server node will not be synchronized with the current object state of the management server node, and therefore, the management server node must communicate and exchange information with the given server node to update the local object state of the given server node.

SUMMARY

Exemplary embodiments of the disclosure include methods to enable object synchronization between server nodes in a network computing environment. For example, in an exemplary embodiment, a management server node modifies a set of objects which is maintained and utilized by the management server node to manage a network computing environment comprising server nodes. The management server node updates a set of container objects in response to modifying the set of objects. Each container object comprises a first attribute to specify a unique identifier of the container object, a second attribute to specify an update generation number of the container object, and a third attribute to specify a unique identifier of an object that is associated with the container object. The management server node performs an object synchronization process using the updated set of container objects to synchronize a set of local objects of a given server node in the network computing environment with the set of objects of the management server node. The object synchronization process comprises identifying each container object having an update generation number which is greater than a last update generation number of the given server node, and sending each of the identified container objects to the given server node for use by the given server node to update the set of local objects of the given server node based on the identified container objects received from the management server node.

Other embodiments of the disclosure include, without limitation, systems and articles of manufacture comprising processor-readable storage media, which are configured to enable object synchronization between server nodes in the network computing environment.

DETAILED DESCRIPTION

Exemplary embodiments of the disclosure will now be discussed in further detail with regard to systems and methods to enable object synchronization between server nodes in a network computing environment. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
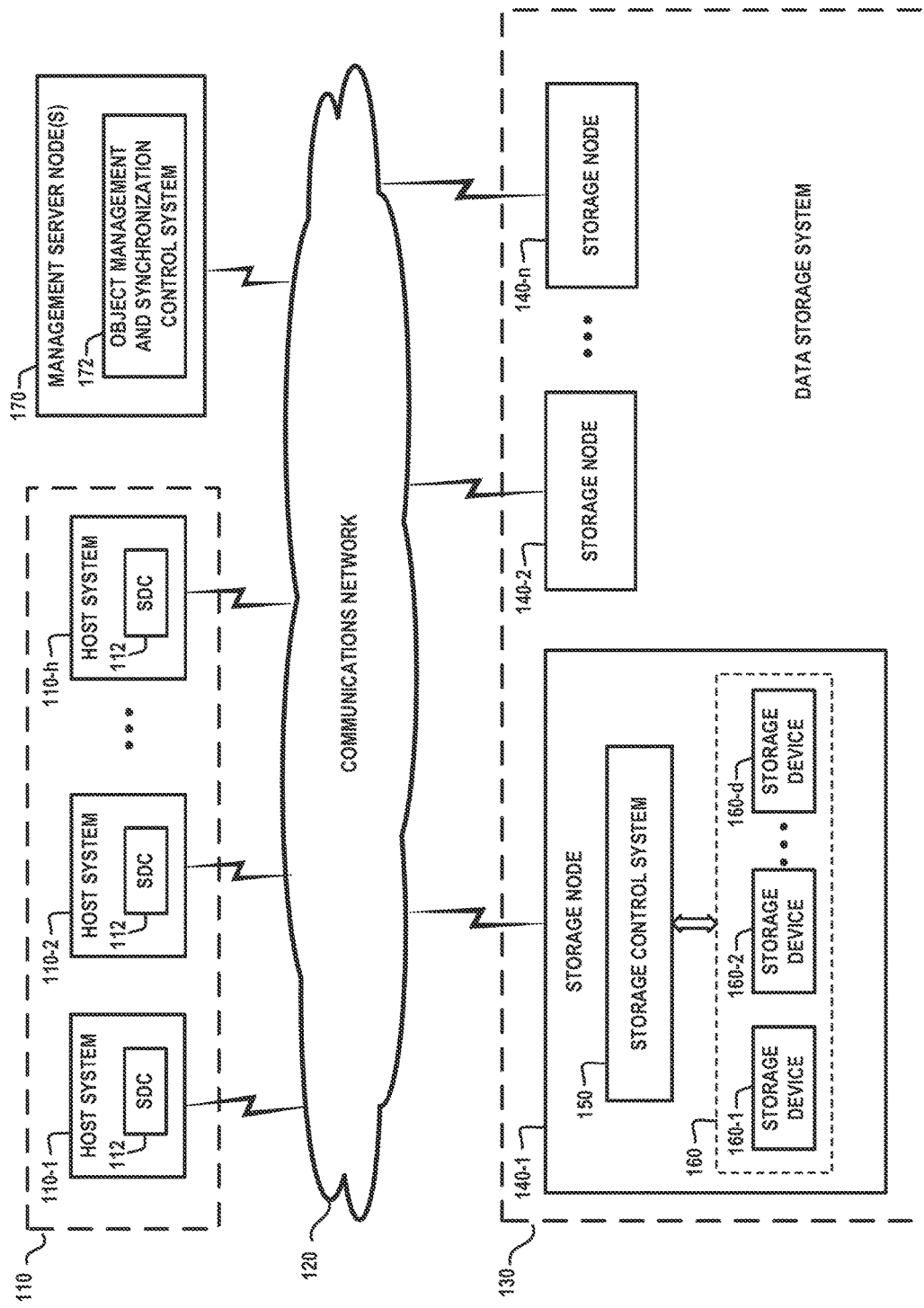
FIG. 1 schematically illustrates a network computing environment which comprises a system that is configured to enable object synchronization between server nodes in the network computing environment, according to an exemplary embodiment of the disclosure.

FIG. 1 schematically illustrates a network computing environment which comprises a system that is configured to enable object synchronization between server nodes in the network computing environment, according to an exemplary embodiment of the disclosure. In particular, FIG. 1 schematically illustrates a network computing system 100 which comprises one or more host systems 110-1, 110-2, . . . 110-$h$ (collectively, host systems 110), a communications network 120, and a data storage system 130. In some embodiments, each host system 110-1, 110-2, . . . 110-$h$ comprises a storage data client (SDC) 112, the functions of which will be explained in further detail below. The data storage system 130 comprises one or more storage nodes 140-1, 140-2, . . . , 140-$n$ (collectively, storage nodes 140). As shown in FIG. 1, the storage node 140-1 comprises a storage control system 150, and an array of storage devices 160-1, 160-2, . . . , 160-$d$ (collectively, storage devices 160). In some embodiments, the other storage nodes 140-2 . . . 140-$n$ have the same or similar configuration as the storage node 140-1 shown in FIG. 1.

The network computing system 100 further comprises one or more management server nodes 170. The management server nodes 170 implement application programming interfaces (APIs) to enable manual, automated, and/or semi-automated configuration, management, provisioning, and monitoring of the data storage system 130 and associated storage nodes 140. In some embodiments, the management server nodes 170 comprise stand-alone dedicated management server nodes, which may comprise physical and/or virtual server nodes. The management server nodes 170 implement an object management and synchronization control system 172. As explained in further detail below, the object management and synchronization control system 172 is configured to generate and maintain a set of objects (e.g., management objects) which are utilized by the management server nodes 170 to manage the network computing environment 100 and the server nodes (e.g., host systems 110, storage nodes 140, etc.). In addition, the object management and synchronization control system 172 is configured to perform object synchronization methods that are configured to synchronize the state of the local objects of each server node in the network computing environment 100 with the current state of the management objects maintained by the management server nodes 170.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 140 and (ii) read requests to access data that is stored in one or more of the storage nodes 140.

The communications network 120 is configured to enable communication between the host systems 110 and the storage nodes 140, and between the management server nodes 170, the host systems 110, and storage nodes 140, as well as to enable communication between the storage nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out data storage system which allows additional storage nodes to be added to the cluster to scale the performance and storage capacity of the data storage system 130. It is to be noted that each storage node 140 and its associated array of storage devices 160 is an example of what is more generally referred to herein as a "storage system" or a "storage array."

In some embodiments, each storage node 140 comprises a server node that is implemented on, e.g., a physical server machine or storage appliance comprising hardware processors, system memory, and other hardware resources that execute software and firmware to implement the functionality of the storage node 140 and storage control system 150. In some embodiments, each storage node 140 comprises a plurality of storage control processors which execute a lightweight operating system (e.g., a customized lightweight Linux kernel) and functional software (e.g., software-defined storage software) to implement various functions of the storage node 140 and storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the cluster, etc.

In a distributed storage environment where the data storage system 130 comprises a cluster of storage nodes 140, the storage control systems 150 of the storage node cluster will communicate in a cooperative manner to process data access requests received from the host systems 110. The data management and storage functions and services implemented by the storage control systems 150 include, but are not limited to, aggregating/pooling the storage capacity of the storage nodes 140, performing functions such as inline data compression/decompression, deduplication, thin provisioning, and data protection functions such as data replication, snapshot, and data protection schemes based on data striping and parity (e.g., RAID), and other types of data management functions, depending on the system configuration.

The storage devices 160 of a given storage node 140 comprise one or more of various types of storage device such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 160 may be implemented in each storage node 140. In this regard, the term "storage device" as used herein should be broadly construed to encompass all types of persistent storage media including hybrid drives. On a given storage node 140, the storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

As noted above, the data storage system 130 can implement any type of dynamic scale-out storage system in which the number of storage nodes within the storage cluster can change over time. In an exemplary embodiment, the data storage system 130 comprises a dynamic scale-out NAS system that is configured to implement a high-capacity file-level storage system architecture (e.g., for storing big data, multimedia objects, and other types of unstructured data). In this configuration, the storage nodes 140 provide a cluster-based storage array, where each storage node 140 comprises a storage server node which executes an integrated custom lightweight operating system that is configured to unify a cluster of the storage nodes 140 into a single shared resource, e.g., create a single file system which is presented to the host systems 110 as a shared filesystem. For example, the operating systems running on the storage nodes 140 operate in a collective matter to generate a global namespace in which multiple file systems are aggregated to present a consolidated view to present files and folders to the host systems 110.

In some embodiments of a dynamic scale-out NAS system, the host systems 110 can run different operating systems (e.g., Windows, Unix/Linux, and Mac operating systems) and communicate with the storage nodes 140 over a TCP/IP LAN or WAN network (e.g., 1 Gigabit Ethernet (GbE), 10GbE, 40GbE, etc.) using various file sharing protocols. Such file sharing protocols include, but are not limited to, Network File System (NFS) protocol, Server Message Blocks (SMB) protocol, Common Internet File Sharing (CIFS) protocol, File Transfer Protocol (FTP), Hypertext Transfer Protocol (HTTP), Hadoop Distributed File System (HDFS) protocol, Apple Filing Protocol (AFP), and other types of current or future industry standard file sharing protocols. Moreover, the storage nodes 140 within the NAS cluster communicate with each other using a dedicated backend high-speed network (e.g., Ethernet LAN, Fibre Channel, InfiniBand network, etc.), wherein the dedicated backend network essentially allows the storage nodes 140 to operate as one storage node. This architecture allows each storage node 140 to have full visibility and write/read access to/from a single expandable file system.

In other embodiments of a dynamic scale-out storage system, the data storage system 130 comprises a dynamic scale-out SAN storage system that is configured to implement a high-capacity block-level storage system architecture which consolidates the capacity of the storage devices 160 (e.g., HDDs, SSDs, PCIe or NVMe flash cards, etc.) of the storage nodes 140 into logical storage volumes (e.g., a block unit of storage management) which are identified by, e.g., logical unit numbers (LUNs). In addition, a logical storage volume can be further divided or partitioned into block units that are identified by LUNs. In the SAN storage system, each storage node 140 within the data storage system 130 executes a lightweight operating system and associated software-defined storage software to implement a software-defined storage environment in which the storage nodes 140 form a loosely coupled storage server cluster in which the storage nodes 140 collectively communicate and operate to create a server-based SAN system (e.g., virtual SAN) to provide host access to a virtual pool of block storage using the combined storage capacity (e.g., local or network storage devices) of the storage nodes 140.

More specifically, in the scale-out SDS environment, the storage control systems 150 of the storage nodes 140 are configured to operate as data storage servers which create and manage storage pools (e.g., virtual pools of block storage) by aggregating storage capacity from their respective storage devices 160 and dividing a given storage pool into one or more volumes, wherein the volumes are exposed to the SDCs 112 of the host systems 110 as block devices. The storage control systems 150 expose abstractions of block devices (e.g., virtual block devices). For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.). In this regard, each instance of the storage control system 150 that runs on a respective one of the storage nodes 140 contributes its local storage space to an aggregated virtual pool of block storage with varying performance tiers (e.g., HDD, SSD, etc.) within a virtual SAN.

While the host systems 110 can communicate over a front-end network (e.g., LAN/WAN), a SAN utilizes a dedicated storage network (e.g., a Fibre Channel fabric, an iSCSI fabric, etc.) to provide an any-to-any connection between the host systems 110 and the storage nodes 140. In this regard, the communications network 120 generically represents such front-end network and dedicated storage network, although such networks can be integrated into a converged Ethernet network. In particular, in some embodiments, the storage nodes 140 of the data storage system 130 are interconnected in a full-mesh network, wherein back-end interconnectivity between the storage control systems 150 of the storage nodes 140 is achieved using, e.g., a redundant high-speed storage fabric (e.g., 40 Gbps InfiniBand). In some embodiments, the storage nodes 140 utilize remote procedure calls (RPC) for control messages and remote direct memory access (RDMA) for moving data blocks. In some embodiments, the host systems 110 and the management server nodes 170 communicate with the storage nodes 140 in a SAN configuration using Ethernet iSCSI and/or Fibre Channel connectivity protocols over the SAN fabric. The SAN fabric comprises SAN networking devices such as SAN switches, routers, protocol bridges, gateway devices, and cables, etc. The SAN network devices move data within the SAN, or between an "initiator" (e.g., an HBA port of an application server) and a "target" (e.g., a port of a storage node 140).

In some embodiments, in addition to the storage control systems 150 operating as storage data servers, the software-defined storage environment comprises other components such as metadata managers (MDMs), which execute on the management server nodes 170, and the SDCs 112 which execute on the host systems 110. More specifically, each SDC 112 that executes on a given host system 110 comprises a lightweight block device driver that is deployed to expose shared block volumes to the host systems 110 (e.g., each SDC exposes the storage volumes as block devices to each application residing on the same server (e.g., host system 110) on which the SDC 112 is installed. In some embodiments, as shown in FIG. 1, the SDCs 112 run on the same server machines as the host systems 110 which require access to the block devices exposed and managed by the storage control systems 150 of the storage nodes 140. The SDC 112 of a given host system 110 exposes block devices representing the virtual storage volumes that are currently mapped to the given host system 110. In particular, the SDC 112 for a given host system 110 serves as a block driver for the host system 110, wherein the SDC 112 intercepts I/O requests, and utilizes the intercepted I/O request to access the block storage that is managed by the storage control systems 150. The SDC 112 provides the operating system or hypervisor (which runs the SDC) access to the logical block devices (e.g., volumes). The SDCs 112 have knowledge of which storage data servers (e.g., storage control systems 150) hold its block data, so multipathing can be accomplished natively through the SDCs 112. This knowledge is provided management objects that are created, updated, and managed by the management server nodes 170.

The management server nodes 170 in FIG. 1 implement a management layer which manages and configures the network computing environment 100. In some embodiments, the management server nodes 170 comprise a tightly-coupled cluster of metadata manager nodes that are configured to supervise the operations of the storage cluster and manage storage cluster configurations. The metadata manager nodes operate outside of the data path and provide the relevant information to the SDCs 112 and the storage control systems 150 (e.g., storage data severs) to allow such components to control data path operations. The metadata managers are configured to manage the mapping of SDCs 112 to the storage control systems 150 (e.g., storage data severs). The metadata managers manage various types of metadata that are required to perform various management operations in the storage environment such as, e.g., managing configuration changes, managing the SDCs and storage data servers, maintaining and updating device mappings, maintaining management metadata for controlling data protection operation such as snapshots, replication, RAID configurations, etc., managing system capacity including device allocations and/or release of capacity, performing operation for recovery from errors and failures, and system rebuild tasks including rebalancing, etc.

While FIG. 1 shows an exemplary embodiment of a two-layer deployment in which the host systems 110 are separate from the storage nodes 140 and connected by the communications network 120, in other embodiments, a converged infrastructure (e.g., hyperconverged infrastructure) can be implemented to consolidate the host systems 110, the storage nodes 140, and communications network 120 together in an engineered system. For example, in a hyperconverged deployment, a single-layer deployment is implemented in which the SDCs 112 and storage data servers (e.g., storage control systems 150) run on the same nodes (e.g., each node deploys a storage data client and storage data servers) such that each node is a data storage consumer and a data storage supplier. In other embodiments, the system of FIG. 1 can be implemented with a combination of a single-layer and two-layer deployment.

Regardless of the specific implementation of the storage environment, in some embodiments, the storage control systems 150 implement any suitable logical volume management system which is configured to create and manage storage volumes by aggregating the storage devices 160 into one or more virtual storage pools and logically dividing each storage pool into one or more storage volumes that are exposed as block devices to the host systems 110. In this regard, each storage control system 150 implements volume management methods that are configured to support operations such as volume creation, volume deletion, volume mapping, etc. The storage control systems 150 of the storage nodes 140 include other modules and other components typically found in conventional implementations of storage controllers and storage systems, although such modules and components are omitted from FIG. 1 for clarity and simplicity of illustration.

Figure 2:
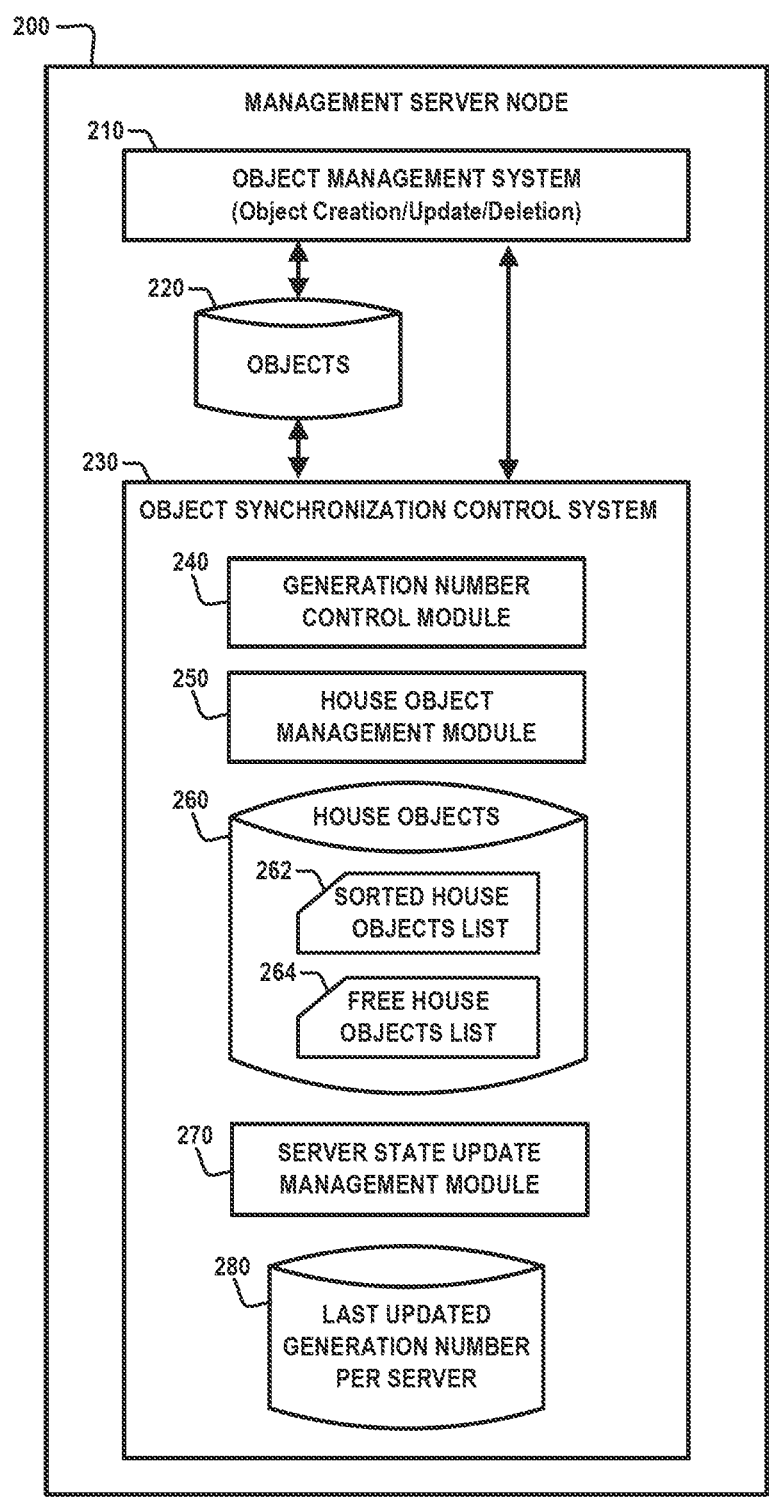
FIG. 2 schematically illustrates a management server node which is configured to enable object synchronization between server nodes in a network computing environment, according to an exemplary embodiment of the disclosure.

FIG. 2 schematically illustrates a management server node which is configured to enable object synchronization between server nodes in a network computing environment, according to an exemplary embodiment of the disclosure. In some embodiments, the management server node 200 of FIG. 2 illustrates an exemplary implementation of the management server node(s) 170 of FIG. 1. The management server node 200 comprises an object management system 210, a datastore of objects 220 (or object datastore 220), and an object synchronization control system 230. In some embodiments, the object management system 210, the object datastore 220, and the object synchronization control system 230 collectively implement an exemplary embodiment of the object management and synchronization control system 172 of FIG. 1. The object synchronization control system 230 comprises a generation number control module 240, a house object management module 250, a datastore of house objects 260, a server state update management module 270 and a datastore 280 which maintains last update generation numbers for each server node within the distributed storage environment.

The object management system 210 implements methods that are configured to create, update, and delete objects (e.g., management objects) which are used for managing a network computing environment (e.g., the distributed storage environment, FIG. 1). The collection of management objects is persistently stored in the object datastore 220, which is managed by the object management system 210. For example, the management objects include objects which comprise the metadata that is used to manage the distributed storage environment. More specifically, for a distributed storage environment such as shown in FIG. 1, the management objects include objects which comprise various types of metadata that is used for managing the storage system including, but not limited to, mappings of SDCs 112 to storage volumes, mappings of SDCs 112 to storage nodes 140, information regarding the collection of available storage pools, information regarding protection domains (each protection domain comprises a plurality of storage data servers (e.g., storage control systems 150) wherein a given storage data server can only belong to one protection domain at any one time), information regarding the set of storage devices in each protection domain, information regarding consistency groups (e.g., volume assignments to consistency groups) for use with configuring and managing data protection schemes (e.g., snapshots, data replication, etc.), information regarding replication topologies, etc.

The generation number control module 240 implements methods that are configured to maintain a global counter which generates a global count value, which is denoted herein as Global_Update_Gen_Num. The Global_Update_Gen_Num comprises a global count value which is utilized to assign an Update_Gen_Num value to a house object when the house object is created or modified, and to assign a Last_Updated_Gen_Num value to a given server node when the state of the local objects of the given server node has been successfully synchronized with a current state of the management objects 220 maintained by the management server node 200. The house object management module 250 implements methods that are configured to generate and manage "house objects" (or more generally referred to herein as "container objects") which are persistently stored in the house objects datastore 260. The house objects are utilized for object synchronization between server nodes of the network computing environment. In some embodiments, a house object can be considered to be a container object which is instantiated to logically contain at most one management object. More specifically, in some embodiments, a container object can virtually contain at most one object (e.g., only one object can reside in a given house object at given time). As explained in further detail below, the house objects provide a mechanism of "indirection" to enable object synchronization by utilizing the house objects to track and maintain object creation, update and deletions in a memory efficient manner, as opposed to tracking the objects themselves.

Figure 3:
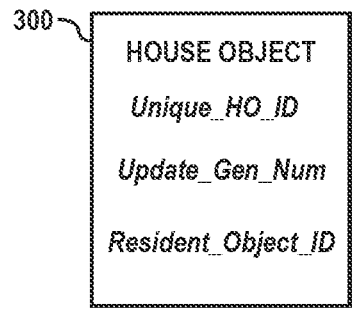
FIG. 3 illustrates a container object that is utilized to enable object synchronization between server nodes in a network computing environment, according to an exemplary embodiment of the disclosure.

FIG. 3 illustrates a container object that is utilized to enable object synchronization between server nodes in a network computing environment, according to an exemplary embodiment of the disclosure. More specifically, FIG. 3 illustrates a container object 300, referred to herein as a house object 300, which is an instance of a House class. The house object 300 comprises a plurality of instance variables/attributes including, e.g., a Unique_HO_ID, an Update_Gen_Num, and a Resident_Object_ID. The Unique_HO_ID attribute comprises a unique identifier for the given house object 300. The Update_Gen_Num attribute is set equal to the current global count value (Global_Update_Gen_Num) when the house object 300 is modified by, e.g., assignment of a new resident object to the house object 300, updating a resident object of the house object 300, or deleting a resident object of the house object 300. The Resident_Object_ID attribute comprises a unique identifier of a resident object of the house object 300. When a given object is assigned to the house object 300, the object will have a pointer to the house object 300, and the Resident_Object_ID will be set equal to the unique ID of the resident object of the house object 300. When a resident object is removed from the house object 300 such that the house object 300 becomes a "free house object," the Resident_Object_ID will be set equal to NULL.

In some embodiments, the house object management module 250 generates and maintains a sorted house objects list 262 and a free house objects list 264. The sorted house objects list 262 comprises a list of instantiated house objects which are sorted according to the pdate_Gen_Num attribute values of the house objects. For example, in some embodiments, the house objects are sorted in a linked list in an order of increasing Update_Gen_Num attribute values of the house objects wherein the house object having the greatest Update_Gen_Num attribute value is positioned at the head of the sorted house objects list 262.

The free house objects list 264 comprises a list of all instantiated house objects which have a Resident_Object_ID that is set equal to NULL. In other words, a "free house object" refers to a given house object which does not virtually contain a management object, i.e., no object resides in the house object. In some embodiments, at a given point in time, the sorted house objects list 262 can include one or more "free house objects" before a reclamation process is performed to reclaim the memory used for the free house objects. As explained in further detail below, a free house object which has no resident object can be reclaimed if all server nodes have been synchronized with the information associated with the free house object.

The server state update management module 270 implements methods that are configured to control server state update operations that are performed to update local objects of server nodes in the distributed network environment. As explained in further detail below, to update the state of the local objects of a given server node, the server state update management module 270 sends a set of relevant house objects to the given server node, and the given server node utilizes the received set of house objects to determine the local objects of the given server node which need to be updated. The server state update management module 270 generates and maintains (in the datastore 280) a last updated generation number (e.g., the Last Updated_Gen_Num value) for each server node in the distributed network environment. As noted above, the ast_Updated_Gen_Num for a given server node is set equal to the current value of the Global_Update_Gen_Num at the last time when the state of the local objects of the given server node was successfully synchronized with a current state of the management objects 220 maintained by the management server node 200.

It is to be appreciated that the use of house objects to enable object synchronization of server nodes in a distributed computing environment provides mechanism to keep track of changes of object states (e.g., object updates and deletions) in manner that is memory bounded, as compared to conventional methods in which metadata for deleted objects must be maintained and provided to server nodes to allow the server nodes to update their local object states. While the number of existing objects (e.g., management objects 220) at any time is bounded by M, the number of objects that that would need to be maintained for server node updates would not be bounded when, for example, the deleted objects are needed to be maintained (at least temporarily) to enable server node updates.

For example, assume that a given server node has been offline (e.g., server node hardware or software failure, power failure of server node, network connection failure, etc.) and not responding for a relatively long period of time in which many object update events (e.g., object creation, update, and deletion operations) have occurred. By way of example, assume that the following sequence of object events occurred during a period of time in which the given server node was offline: Object_1 is deleted, Object_2 is created, Object_2 is deleted, Object_3 is created, Object_3 is deleted, . . . , Object_n-1 is created, Object_n-1 is deleted, Object_n is created. When the given server node is back online, the local object state of the server node would need to be updated based on object events that occurred during the time when the server node was offline. However, the given server node would not need information regarding every object event that occurred during such time. For example, for the above sequence of object events, assuming the server node had knowledge of Object_1 before going offline, the server node would only need to know that Object_1 was deleted, and that Object_n was created, to properly update the local object state of the server node when it came back online. On the other hand, the information regarding the object events Object_2 is created, Object_2 is deleted, Object_3 is created, Object_3 is deleted, . . . , Object_n-1 is created, and Object_n-1 would not be needed for the server node to properly update its local object state.

In accordance with exemplary embodiments of the disclosure, object synchronization is performed using house objects instead of the objects themselves. For example, in the above exemplary sequence of object events, assume that Object_1 was initially assigned to House_Object_A, and that the House_Object_A was used to track the above sequence of object events. In particular, assume that at various points in time, Object_2 replaced Object_1 in House_Object_A (after Object_1 was deleted), and then Object_3 replaced Object_2 in House_Object_A (after Object_2 was deleted), and so on until Object_n replaced Object_n-1 in House_Object_A (after Object_n-1 was deleted).

When the server node is back online, the local object state of the server node can be updated based on information derived from the House_Object_A. More specifically, assuming the server node had prior knowledge that Object_1 was the resident object of House_Object_A, when the server node came back online and received the updated House_Object_A, the server node would determine that Object_n was the current resident object of House Object_A, and that Object_1 is no longer the resident object of House_Object_A. This allows the server node to determine that Object_1 has been deleted, and that Object_n is a new object, whereby the server node can update its state of local objects by deleting Object_1 and adding Object_n to the local set of objects.

As noted above, the house object management module 250 maintains a sorted house objects list 262, wherein the house objects in the sorted house objects list 262 are sorted according to their current Update_Gen_Num. When the resident object of a given house object is changed (e.g., resident object is added, updated or deleted), the Update_Gen_Num value of the house object is set equal to the current value of Global_Update_Gen_Num, and the house object is moved to the head of the sorted house objects list 262. In this manner, the house objects in the sorted house objects list 262 are arranged in an order of increasing values of the Update_Gen_Num values of the house objects.

Furthermore, as noted above, the management server node 200 maintains the Last_Updated_Gen_Num value for each server node, which corresponds to the value of the Global_Update_Gen_Num at a previous time when the state of the local objects of given server node was last successfully synchronized with a current state of the management objects 220 maintained by the management server node 200. In this regard, since the Update_Gen_Num values of the house objects and the Last Updated_Gen_Num values of the server nodes are derived from, and thus correlated to, the Global_Update_Gen_Num, the server state update management module 270 of the management server node 200 can determine exactly what information (e.g., which house objects) needs to be sent to a given server node to update the local object state of the given server node.

For example, in some embodiments, the server state update management module 270 of the management server node 200 utilizes the sorted house objects list 262 to determine which house objects need to be sent to a given server node. More specifically, starting with the house object at the head of the list (which has the greatest Update_Gen_Num value), the server state update management module 270 will identify all house objects in the sorted house objects list 262 for which the Update_Gen_Num value of the house object is greater than the Last_Updated_Gen_Num value of the given server node. In this regard, by traversing the sorted house objects list 262, the server state update management module 270 determines all house objects which have been updated subsequent to the last time the local object state of the given server node was successfully synchronized with the object state of the management server node 200.

Figure 4:
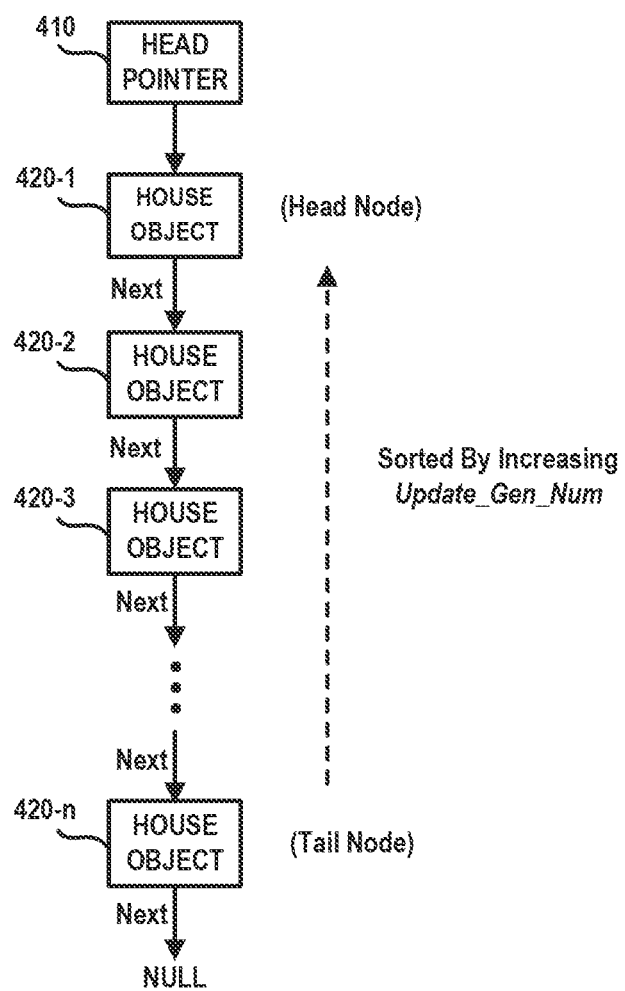
FIG. 4 illustrates a data structure that is utilized to implement a sorted list of container objects to enable object synchronization between server nodes in a network computing environment, according to an exemplary embodiment of the disclosure.

FIG. 4 illustrates a data structure that is utilized to implement a sorted list of container objects to enable object synchronization between server nodes in a network computing environment, according to an exemplary embodiment of the disclosure. More specifically, FIG. 4 illustrates a sorted list of house objects which is implemented using a linked list data structure 400 with a head pointer 410 and a plurality (n) of linked list nodes 420-1, 420-2, 420-3, . . . , 420-n which correspond to different house objects. In some embodiments, each linked list node 420-1, 420-2, 420-3, . . . , 420-n comprises at least two fields including (i) a first field which comprises a Next pointer that points to a next list node in the sequence of list nodes 420-1, 420-2, 420-3, . . . , 420-n, and (ii) a second field which comprises, e.g., a pointer to a house object (in the datastore of house objects 260) that corresponds to the given list node. The first list node 420-1 is deemed the head list node as it is pointed to by the head pointer 410. The list node 420-n is deemed the tail list node since it has a Next pointer which has a NULL value.

In the exemplary embodiment of FIG. 4, the house objects corresponding to the list nodes 420-1, 420-2, 420-3, . . ., 420-n are sorted by increasing Update_Gen_Num values of the house objects, wherein the house object corresponding to the head list node 420-1 (at a given point in time) has the greatest Update_Gen_Num value among the house objects in the sorted list 400, and wherein the house object corresponding to the tail node 420-n (at the given point in time) has the smallest Update_Gen_Num value among the house objects in the sorted list 400. When traversing the sorted list 400, the server state update management module 270 will utilize the head pointer 410 of the sorted list 400 to determine the head list node 420-1 and corresponding house object, and then sequentially traverse list nodes in the sorted list 400 using the Next pointers to determine corresponding house objects with Update_Gen_Num values which are greater than the Last_Updated_Gen_Num value of a given server node that is to be updated.

In some embodiments, the number of house objects (including free house objects) that can exist at any point in time is bounded by a maximum number N of allowed house objects which, in turn, places a bound M on the amount of memory that is allocated at any given point in time for the instantiated house objects and associated stored list. In this regard, the number (n) of list nodes in the sorted list 400 of FIG. 4 will be limited to n≤N. As explained in further detail below, the number of house objects that exist at a given point in time can be maintained at a level of n≤N by "reclaiming" free house objects which have (i) a Resident_Object_ID value equal to NULL, and (ii) an Update_Gen_Num value which is less than or equal to Last_Updated_Gen_Num value of all server nodes in the network computing environment.

It is to be understood that FIG. 4 illustrates an exemplary embodiment for utilizing a linked list data structure to implement the sorted house objects list 262 which are sorted based on the Update_Gen_Num values of the house objects. In some embodiments, other types of sequence containers can be utilized to implement the sorted house objects list 262, which are known to those of ordinary skill in the art.

Figure 5:
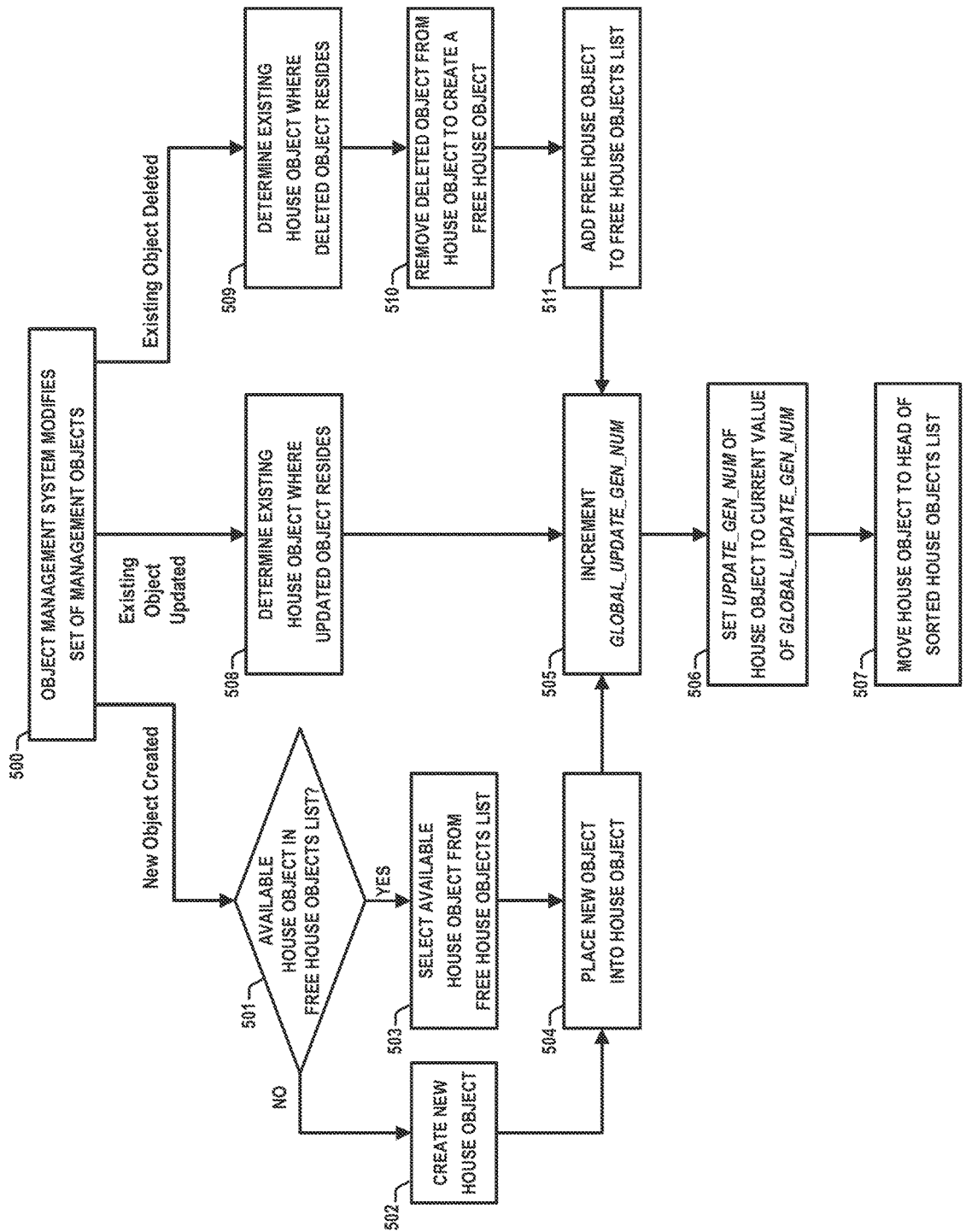
FIG. 5 is a flow diagram of a method for managing container objects to enable object synchronization between server nodes in a network computing environment, according to an exemplary embodiment of the disclosure.

FIG. 5 is a flow diagram of a method for managing container objects to enable object synchronization between server nodes in a network computing environment, according to an exemplary embodiment of the disclosure. For illustrative purposes, the process flow of FIG. 5 will be discussed in the context of the exemplary management server node 200 of FIG. 2 wherein, in some embodiments, FIG. 5 illustrates an exemplary house object management process that is performed by the object synchronization control system 230 in response to the object management system 210 creating, updating, or deleting a given management object in the object datastore 220.

Referring to FIG. 5, at a given point in time, the object management system 210 of the management server node 200 will modify the set of management objects 220 by creating, updating, or deleting a given object (block 500). When a new object is created, the object synchronization control system 230 will proceed to obtain a house object for the newly created object. More specifically, in some embodiments, the house object management module 250 will access the free house objects list 264 to determine if there is an available free house object which can be assigned to the newly created object (block 501). If it is determined that a free house object is not available (negative determination in block 501), the house object management module 250 will create (e.g., instantiate) a new house object using the House class (block 502). On the other hand, if it is determined that a free house object is available (affirmative determination in block 501), the house object management module 250 will select an available free house object from the free house objects list 264 (block 503).

The newly created object is then placed into the house object, i.e., the newly created house object or the selected free house object (block 504). In some embodiments, the newly created object is placed into (or otherwise assigned to) the house object by, e.g., setting the Resident_Object_ID attribute of the house object equal to a unique identifier of the newly created object, and generating a pointer, which is held by the newly created object, and which points to the house object in which the newly created object resides.

The process flow then continues with the generation number control module 240 incrementing the value, Global_Update_Gen_Num, of the global generation counter (e.g., incrementing the value by one) to generate a current Global_Update_Gen_Num value (block 505). The house object management module 250 will set the Update_Gen_Num value of the house object equal to the current Global_Update_Gen_Num value (block 506), and then move the house object to the head of the sorted house objects list 262 (block 507).

Referring back to bock 500, when the object management system 210 updates an existing object, the object synchronization control system 230 will proceed to determine and access the existing house object in which the updated object resides (block 508). For example, in some embodiments, the existing house object is determined and accessed using the pointer to the existing house object which is held by the updated object. The process flow then continues with incrementing the Global_Update_Gen_Num (block 505), setting the Update_Gen_Num value of the house object equal to the current Global_Update_Gen_Num value (block 506), and then moving the house object to the head of the sorted house objects list 262 (block 507).

Referring back to bock 500, when the object management system 210 deletes an existing object, the object synchronization control system 230 will proceed to determine and access the existing house object in which the deleted object resides (block 509). As noted above, in some embodiments, the existing house object is determined and accessed using the pointer to the existing house object which was held by the deleted object. The house object management module 250 proceeds to remove the deleted object from the house object to thereby create a free house object (block 510). In some embodiments, the deleted object is removed from the house object by setting the Resident_Object_ID attribute value of the house object equal to NULL. This effectively removes (or otherwise disassociates) the deleted object from the house object such that the house object becomes a free house object. The house object management module 250 adds the resulting free house object to the free house objects list 264 (block 511). The process flow then continues with incrementing the Global_Update_Gen_Num (block 505), setting the Update_Gen_Num value of the free house object equal to the current Global_Update_Gen_Num value (block 506), and then moving the free house object to the head of the sorted house objects list 262 (block 507). In this regard, the free house object becomes available for use in housing a new object that may be subsequently created by the object management system 210 before reclamation of the free house object.

Figure 6:
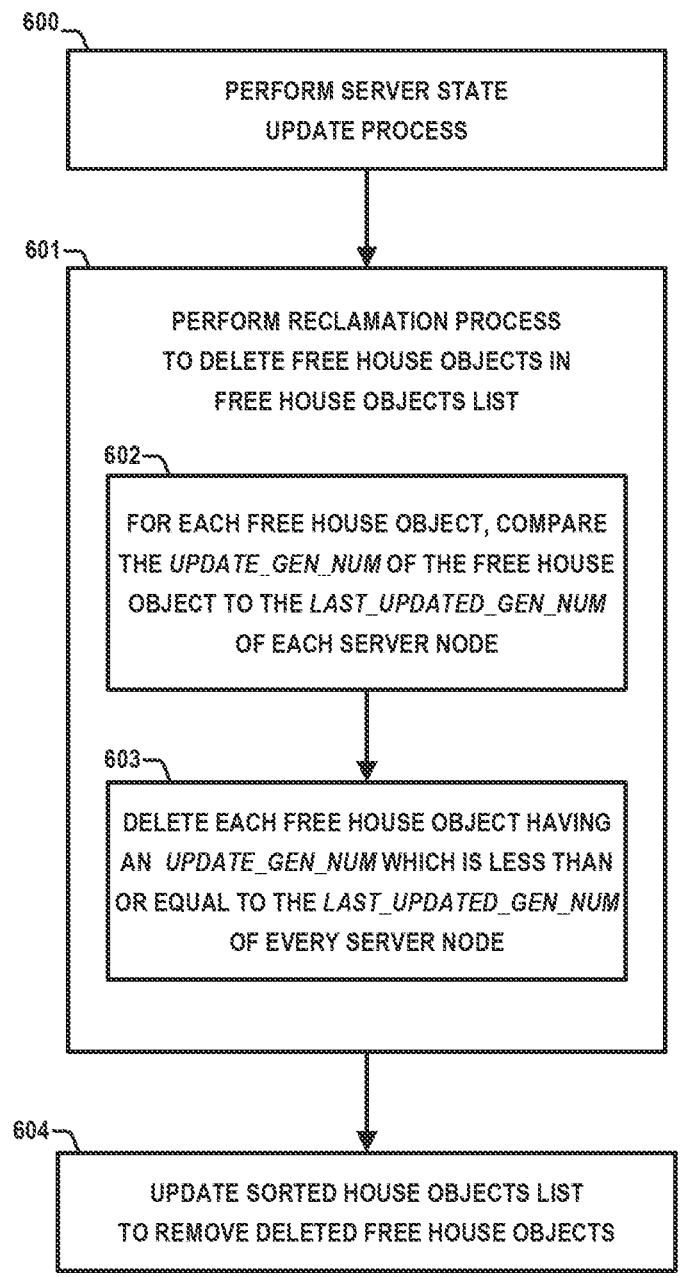
FIG. 6 is a flow diagram of method to reclaim container objects following an object synchronization process in which local object states of server nodes are updated, according to an exemplary embodiment of the disclosure.

FIG. 6 is a flow diagram of method to reclaim container objects following an object synchronization process in which local object states of server nodes are updated, according to an exemplary embodiment of the disclosure. In some embodiments, FIG. 6 illustrates an exemplary house object reclamation process that is performed by the object synchronization control system 230 (FIG. 2) following an update of the local object states of server nodes in the network computing environment. In this regard, for illustrative purposes, the process flow of FIG. 6 will be discussed in the context of the exemplary management server node 200 of FIG. 2.

Referring to FIG. 6, the server state update management module 270 performs a server state update process to update the local object states of server nodes (block 600). In some embodiments, the server state update process is performed in response to the occurrence of one of a plurality of predefined events which trigger initiation of the server update process. For example, in some embodiments, a server state update process is performed in response the creation, update, or deletion of a management object. In some embodiments, a server state update process is performed to update a given server node which has come back online (after being offline for some period of time), and has a local object state which needs to be updated. Following completion of the server state update process, the object synchronization control system 230 performs an object reclamation process to delete free house objects that are contained in the free house objects list 264 (block 601). As noted above, a free house object is a house object which has a Resident_Object_ID attribute value set equal to NULL.

In some embodiments, the reclamation process (block 601) performed by the house management object module 250 comprises, for each free house object in the free house objects list, the house object management module 250 comparing the Update_Gen_Num value of the free house object to the Last_Updated_Gen_Num of every server node in the network computing environment (block 602), and deleting each free house object having an Update_Gen_Num value which is less than or equal to the Last_Updated_Gen_Num of all server nodes in the network computing environment (block 603). Thereafter, the sorted house objects list 262 is updated by removing free house objects which have been deleted as a result of the reclamation process (block 604).

The reclamation process (block 601) ensures that only those free house objects, which are no longer needed for updating the local object state of any server node, can be deleted. For example, if there exists a given server node which has been offline for some period of time, and which has a Last_Updated_Gen_Num that is less than the Update_Gen_Num value of a given free house object, then the free house object will not be deleted as such free house object would still be needed to update the local object state of the given server node when such server node comes back online in the network computing environment. On the other hand, for each free house object that is deleted from the free house objects list 264, the sorted house objects list 262 can be updated to remove the list nodes associated with the deleted free house objects, as the inclusion of such deleted free house objects are no longer needed in the sorted house objects list 262 for purposes of identifying the house objects needed for object synchronization of a given server node.

Figure 7:
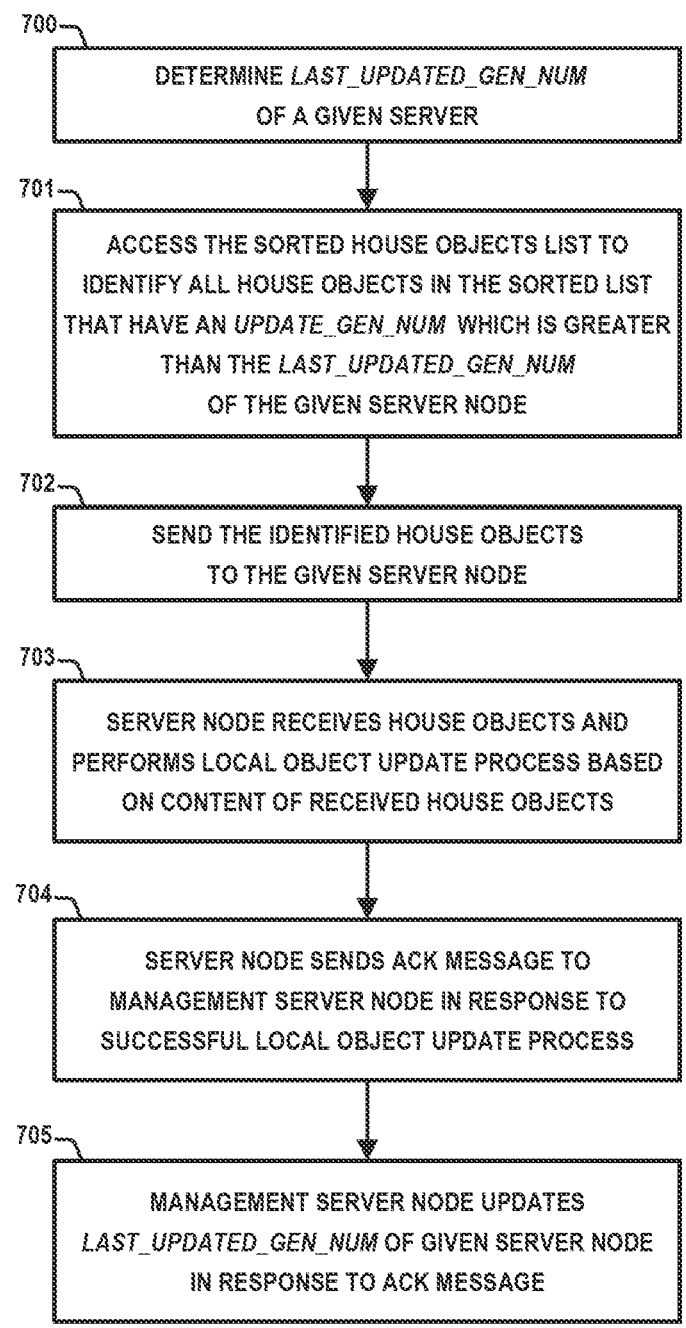
FIG. 7 is a flow diagram of a method for performing an object synchronization process to update the local object state of a server node, according to an exemplary embodiment of the disclosure.

FIG. 7 is a flow diagram of a method for performing an object synchronization process to update the local object state of a server node, according to an exemplary embodiment of the disclosure. More specifically, FIG. 7 illustrates an exemplary process which is performed by the object synchronization control system 230 (FIG. 2) and a given server node in the network computing environment managed by the management server node 200 to update the local object state of the given server node. The process flow of blocks 700, 701, 702, and 705 are performed by the object synchronization control system 230, and the process flow of blocks 703 and 704 are performed by the given server node whose local object state is being updated.

Figure 8:
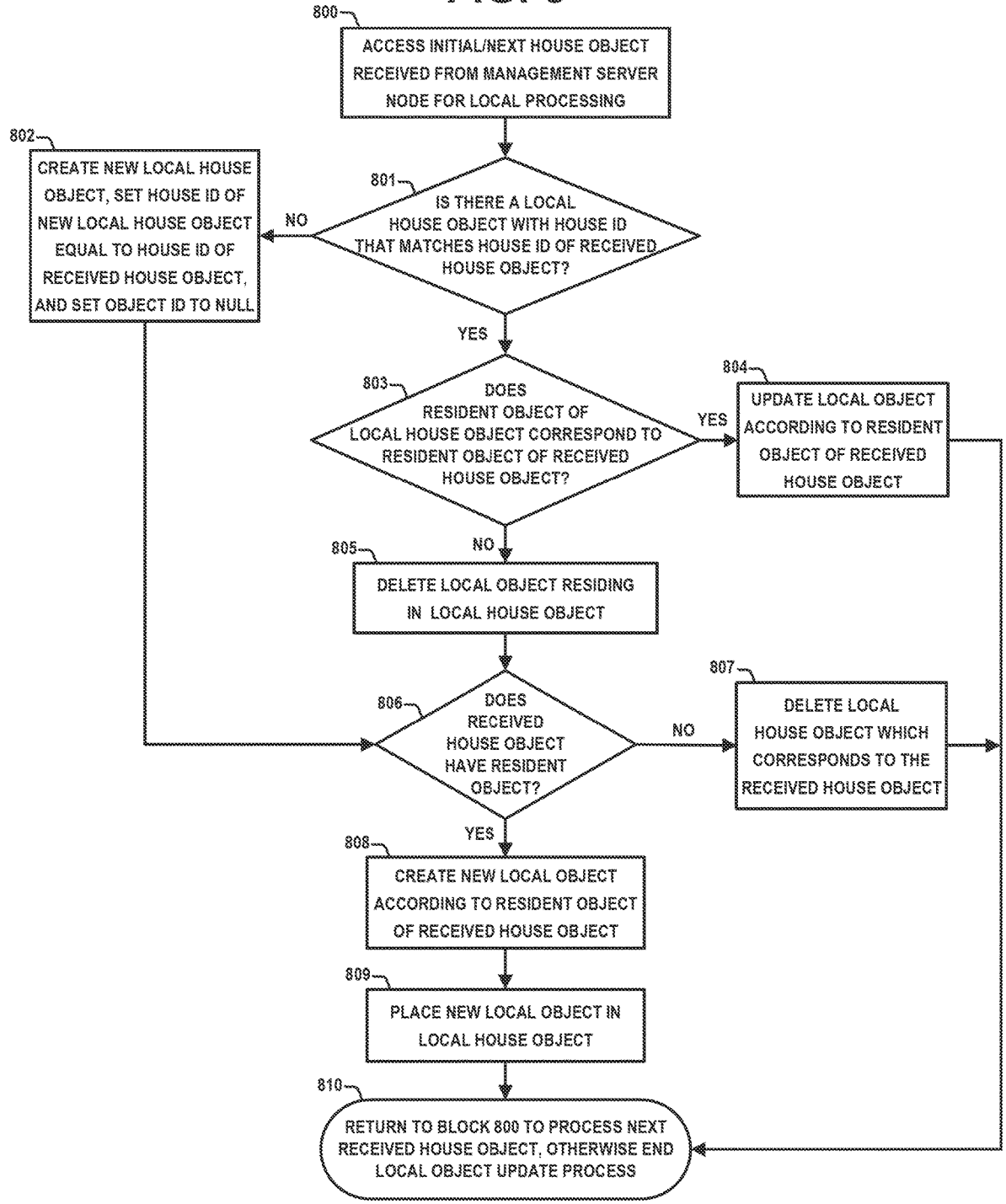
FIG. 8 is a flow diagram of a method that is performed by a server node to update local objects of the server node based on container objects received from a management server node, according to an exemplary embodiment of the disclosure.

The server state update management module 270 determines the Last_Updated_Gen_Num for the given server node (block 700) and accesses the sorted house objects list 262 to identify all house objects in the sorted list that have an Update_Gen_Num value which is greater than the Last_Updated_Gen_Num of the given server node (block 701). For example, as discussed above in conjunction with the exemplary embodiment of FIG. 4, in some embodiments, the server state update management module 270 can sequentially traverse the sorted list 400, starting with the head list node 420-1 and corresponding house object pointed to by the head pointer 410, to determine the house objects with Update_Gen_Num values that are greater than the Last_Updated_Gen_Num value of the given server node. The server state update management module 270 sends the identified house objects to the given server node to initiate the local object state update process on the given server node (block 702). In particular, the given server node will receive the house objects and then perform a local object update process based on the content of the received house objects (block 703), exemplary details of which will be discussed in further detail below in conjunction with the exemplary flow diagram of FIG. 8. The given server node will send an acknowledgement (ACK) message to the management server node 200 in response to a successful completion of the local object update process (block 704). In response to the received ACK message from the given server node, the management server node 200 will proceed to update the Last Updated_Gen_Num value of the given server node (block 705) by setting the value of the Last Updated_Gen_Num of the server node equal to the current Global_Update_Gen_Num value at the time the update process was initiated. FIG. 8 is a flow diagram of a method that is performed by a server node to update local objects of the server node based on container objects received from a management server node, according to an exemplary embodiment of the disclosure. More specifically, in some embodiments, FIG. 8 illustrates an exemplary local object synchronization process that is performed by a given server node (e.g., block 703 of FIG. 7) to update local objects based on house objects received from the object synchronization control system 230 of the management server node 200 (FIG. 2). The server node receives the house objects from the management server node 200 and begins a local processing operation for each of the received house objects (block 800). For illustrative purposes, in FIG. 8, it is assumed that each of the received house objects is processed in sequence starting from an initial selected house object, although it is to be understood that multiple house objects can be locally processed by the server node in a concurrent manner.

For a given house object received from the object synchronization control system 230, the server node determines whether there is a local house object with a unique house ID that matches the unique house ID, Unique_HO_ID, of the received house object (block 801). If the server node determines that no local house object exists with a unique house ID that matches the Unique_HO_ID of the received house object (negative determination in block 801), the server node will proceed to create a new local house object, set the unique house ID of the new local house object equal to the Unique_HO_ID of the received house object, and initially set the unique object ID value of the new local house object equal to NULL (block 802). The process flow then proceeds to block 806, the details of which will be explained in further detail below.

If the server node determines that a local house object does exist with a unique house ID which matches the Unique_HO_ID of the received house object (affirmative determination in block 801), the server node determines whether a resident object of the local house object corresponds to the resident object of the received house object (block 803). For example, in some embodiments, this determination is made by comparing the unique resident object ID value of the local house object with the unique resident object ID value, Resident_Object_ID, of the received house object. It is to be noted that in some instances, the Resident_Object_ID value of the received house object may be NULL, in which case the received house object is a free house object with no resident object.

If the server node determines that the resident object of the local house object does correspond to the resident object of the received house object (affirmative determination in block 803), the server node proceeds to update the local object based on the resident object of the received house object (block 804). In this instance, the server node will know that the resident object of the received house object is an updated version of the corresponding local object, so the server node will synchronize the state of its local objects by replacing the local object with the corresponding updated object of the received house object. The process flow then proceeds (to block 810) to determine if there are additional received house objects to be locally processed, and if so, the process flow returns to block 800 to select the next received house object for local processing. If all received house objects have been locally processed, the server node will terminate the local object update process.

On the other hand, if the server node determines that the resident object of the local house object does not correspond to the resident object of the received house object (negative determination in block 803), the server node will proceed to delete the local object which resides in the local house object (block 805). For example, the resident object of the local house object will not correspond to the resident object of the received house object when the Resident_Object_ID of the received house object is either (i) set to NULL (free house object) or (ii) does not match the unique object ID of the resident object of the local house object. In this instance, the server node will know that the local object which resides in the local house object was deleted by the management server node 200. Accordingly, the server node will synchronize the state of its local objects by deleting the local object associated with the local house object.

Next, a determination is made as to whether the received house object has a resident object (block 806). As noted above, in some instances, the received house object will be a free house object, in which case the received house object will not have a resident object. If the server node determines that the received house object does not have a resident object (negative determination in block 806), the server node will proceed to delete the local house object which corresponds to the received house object (block 807). It is to be noted that the local house object which is deleted (in block 807) may be the newly created local house object (block 802), assuming the process flow proceeds from block 802 to block 806. Otherwise, the local house object which is deleted (in block 807) will be an existing local house object which corresponds to the received house object being processed. The process flow then proceeds (to block 810) to determine if there are additional received house objects to be locally processed, and if so, the process flow returns to block 800 to select the next received house object for local processing. If all received house objects have been locally processed, the server node will terminate the local object update process.

On the other hand, if the server node determines that the received house object does have a resident object (affirmative determination in block 806), the server node will proceed to create a new local object according to the resident object of the received house object (block 808). In this instance, the server node will know that the resident object of the received house object is a new object that was created by the management server node 200, so the server node will synchronize the state of its local objects by adding a new local object which corresponds to the resident object of the received house object.

The newly created local object is placed in the local house object (block 809). In some embodiments, this process is performed by setting the unique object ID of the local house object equal to the Resident_Object_ID value of the received house object. In this manner, the local house object will virtually contain the newly created object. It is to be noted that the local house object (in block 809) may be the newly created local house object (in block 802), assuming the process flow proceeds from block 802 to blocks 806, 808, and 809. The process flow then proceeds (to block 810) to determine if there are additional received house objects to be locally processed, and if so, the process flow returns to block 800 to select the next received house object for local processing. If all received house objects have been locally processed, the server node will terminate the local object update process.

It is to be appreciated that the object synchronization techniques as disclosed herein allow for a minimal amount of data to be transmitted over the network between the server nodes for purposes performing local object update operations by the server nodes. In addition, such techniques allow for bounding the amount of memory that is needed to maintain M objects by O(M) at any point of time. Such techniques further guarantee that at any point in time, no more memory is utilized than the minimum amount of memory needed to perform an object synchronization process to update the state of the local objects of a given server node with the current state of the objects of the management server node.

The object synchronization techniques as disclosed herein provide significant advantages over existing approaches. For example, a widely used conventional object synchronization process for updating the local object state of a given server node which comes back online after crashing (thus missing some messages) is that the server node will send the management server node all of the following state: state={objectId: object generation|for each object that this server node has in its database}. The management server node, in turn, verifies the local state of the server node with the current state of the management server node, and sends the server node all information that the server node missed during the period in which the server node was offline. This object synchronization process is not a scalable approach given the fact that the maximal number M of objects may be extremely large, thus on each crash of server, the size of the state information that the server node would need to send on the network to the management server node may be extremely large. The object synchronization techniques as disclosed herein guarantee that the only state information which a given server node would need to send after recovering from a crash is a single generation number (e.g., last updated generation number).

Figure 9:
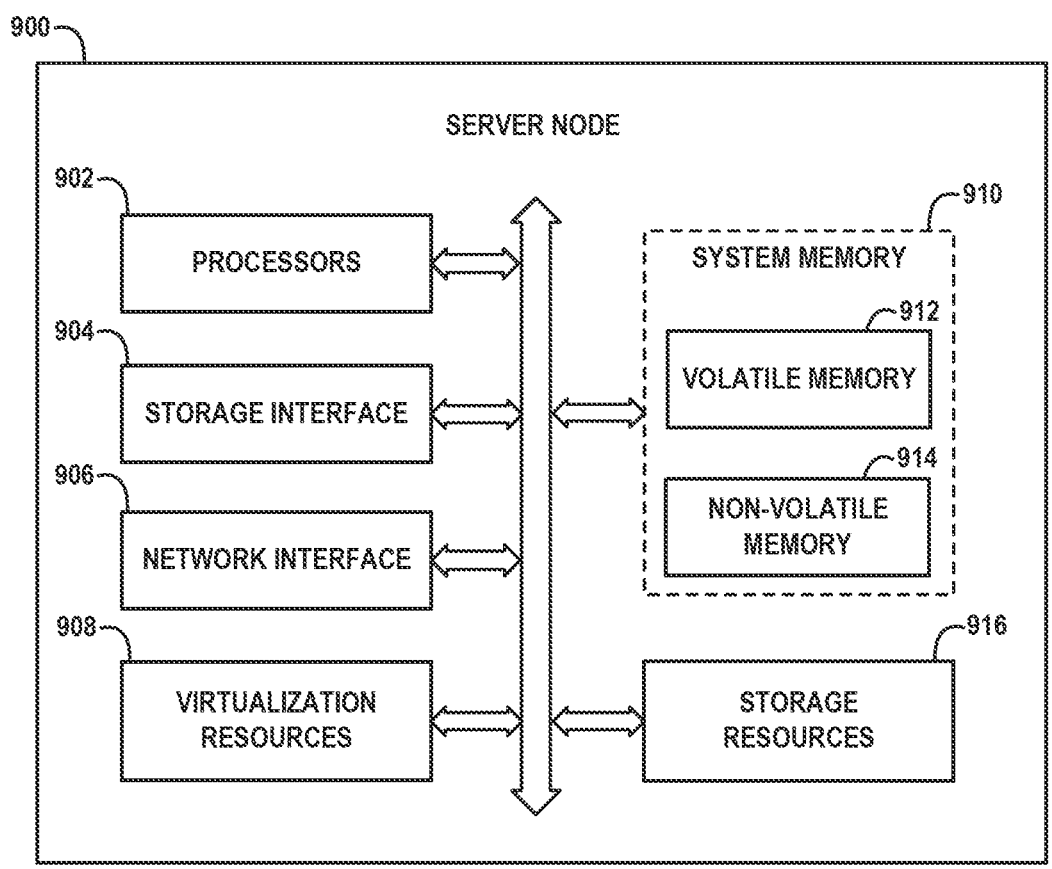
FIG. 9 schematically illustrates an architecture of a server node which can be used to implement the management server nodes of FIGS. 1 and 2, according to an exemplary embodiment of the disclosure.

FIG. 9 schematically illustrates an architecture of a server node which can be used to implement the management server nodes of FIGS. 1 and 2, according to an exemplary embodiment of the disclosure. More specifically, in some embodiments, FIG. 9 illustrates an exemplary embodiment of a management server node which hosts and runs an object synchronization control system (e.g., system 172, FIG. 1 or system 230, FIG. 2). The server node 900 comprises processors 902, storage interface circuitry 904, network interface circuitry 906, virtualization resources 908, system memory 910, and storage resources 916. The system memory 910 comprises volatile memory 912 and non-volatile memory 914. The processors 902 comprise one or more types of hardware processors that are configured to process program instructions and data to execute a native operating system (OS) and applications that run on the server node 900.

For example, the processors 902 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 904 enables the processors 902 to interface and communicate with the system memory 910, the storage resources 916, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 906 enables the server node 900 to interface and communicate with a network and other system components. The network interface circuitry 906 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 908 can be instantiated to execute one or more services or functions which are hosted by the server node 900. For example, the virtualization resources 908 can be configured to implement the various modules and functionalities of a host connectivity management system as discussed herein. In one embodiment, the virtualization resources 908 comprise virtual machines that are implemented using a hypervisor platform which executes on the server node 900, wherein one or more virtual machines can be instantiated to execute functions of the server node 900. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 900, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 908 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 900 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components (e.g., modules 220, 230, 240) of the host connectivity management system 210 (FIG. 2) comprise program code that is loaded into the system memory 910 (e.g., volatile memory 912), and executed by the processors 902 to perform respective functions as described herein. In this regard, the system memory 910, the storage resources 916, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 910 comprises various types of memory such as volatile RAM, NVRAM, or other types of memory, in any combination. The volatile memory 912 may be a dynamic random-access memory (DRAM) (e.g., DRAM DIMM (Dual In-line Memory Module), or other forms of volatile RAM. The non-volatile memory 914 may comprise one or more of NAND Flash storage devices, SSD devices, or other types of next generation non-volatile memory (NGNVM) devices. The system memory 910 can be implemented using a hierarchical memory tier structure wherein the volatile system memory 912 is configured as the highest-level memory tier, and the non-volatile system memory 914 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 902 to execute a native operating system and one or more applications or processes hosted by the server node 900, and to temporarily store data that is utilized and/or generated by the native OS and application programs and processes running on the server node 900. The storage resources 916 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
    modifying, by a management server node, a set of management objects which is maintained and utilized by the management server node to manage a network computing environment comprising server nodes;
    updating, by the management server node, a set of container objects in response to modifying the set of management objects, wherein the set of container objects are configured to track changes to the set of management objects, wherein each container object comprises a first attribute to specify a unique identifier of the container object, a second attribute to specify an update generation number of the container object which is assigned in conjunction with updating of the container object, and a third attribute to specify a unique identifier of a given management object that is logically associated with the container object; and
    performing, by the management server node, an object synchronization process using the updated set of container objects to synchronize a set of local objects of a given server node in the network computing environment with the set of management objects of the management server node;
    wherein performing the object synchronization process comprises:
        identifying, by the management server node, each container object having an update generation number which is greater than a last update generation number of the given server node; and
        sending, by the management server node, each of the identified container objects to the given server node for use by the given server node to update the set of local objects of the given server node based on the identified container objects received from the management server node.

2. The method of claim 1, wherein the network computing environment comprises a distributed storage environment, and wherein the server nodes comprise storage server nodes.

3. The method of claim 1, further comprising:
    updating, by the management server node, a sorted list of container objects in response to updating the set of container objects, wherein the sorted list of container objects comprises one or more container objects which are sorted according to the update generation numbers of the one or more container objects;
    wherein identifying each container object having an update generation number which is greater than a last update generation number of the given server node comprises utilizing, by the management server node, the sorted list to identify each container object in the sorted list having an update generation number which is greater than the last update generation number of the given server node.

4. The method of claim 3, wherein:
    modifying the set of management objects comprises creating a new management object; and
    updating the set of container objects comprises:
        obtaining a container object;
        setting a value of the third attribute of the container object to a unique object identifier of the new management object;
        incrementing a global generation counter to generate a new global update generation number;
        setting a value of the second attribute of the container object equal to the new global update generation number; and
        placing the container object in a head position of the sorted list of container objects.

5. The method of claim 4, wherein obtaining the container object comprises:
    accessing a list of free container objects to determine if a free container object is available for the new management object;
    selecting a free container object from the list of free container objects, in response to determining that the free container object is available; and
    creating a new container object in response to determining that no free container object is available, wherein a value of the first attribute of the new container object is set equal to a new unique identifier of the new container object.

6. The method of claim 3, wherein:
    modifying the set of management objects comprises updating an existing management object; and
    updating the set of container objects comprises:
        accessing a container object which is associated with the updated management object;
        incrementing a global generation counter to generate a new global update generation number;
        setting a value of the second attribute of the container object equal to the new global update generation number; and
        placing the container object in a head position of the sorted list of container objects.

7. The method of claim 3, wherein:
    modifying the set of management objects comprises deleting an existing management object; and
    updating the set of container objects comprises:
        accessing a container object which is associated with the deleted management object;
        setting a value of the third attribute of the container object to null to thereby create a new free container object;
        adding the new free container object to the list of free container objects;
        incrementing a global generation counter to generate a new global update generation number; and
        setting a value of the second attribute of the new free container object equal to the new global update generation number.

8. The method of claim 1, further comprising performing, by the management server node, a reclamation process to delete a free container object, wherein the free container object comprises a container object in which a value of the third attribute of the container object is set to null, wherein the reclamation process comprises:
  comparing a value of the update generation number of the second attribute of the free container object to a last updated generation number of each server node in the network computing environment managed by the management server node; and
  deleting the free container object in response to determining that the update generation number of the free container object is less than or equal to the last updated generation number of each server node in the network computing environment managed by the management server node.

9. An article of manufacture comprising a non-transitory processor-readable storage medium having stored therein program code of one or more software programs, wherein the program code is executable by one or more processors to implement a method which comprises:
  modifying, by a management server node, a set of management objects which is maintained and utilized by the management server node to manage a network computing environment comprising server nodes;
  updating, by the management server node, a set of container objects in response to modifying the set of management objects, wherein the set of container objects are configured to track changes to the set of management objects, wherein each container object comprises a first attribute to specify a unique identifier of the container object, a second attribute to specify an update generation number of the container object which is assigned in conjunction with updating of the container object, and a third attribute to specify a unique identifier of a given management object that is logically associated with the container object; and
  performing, by the management server node, an object synchronization process using the updated set of container objects to synchronize a set of local objects of a given server node in the network computing environment with the set of management objects of the management server node;
  wherein performing the object synchronization process comprises:
    identifying, by the management server node, each container object having an update generation number which is greater than a last update generation number of the given server node; and
    sending, by the management server node, each of the identified container objects to the given server node for use by the given server node to update the set of local objects of the given server node based on the identified container objects received from the management server node.

10. The article of manufacture of claim 9, further comprising program code that is executable by the one or more processors to implement a method which comprises:
  updating, by the management server node, a sorted list of container objects in response to updating the set of container objects, wherein the sorted list of container objects comprises one or more container objects which are sorted according to the update generation numbers of the one or more container objects;
  wherein identifying each container object having an update generation number which is greater than a last update generation number of the given server node comprises utilizing, by the management server node, the sorted list to identify each container object in the sorted list having an update generation number which is greater than the last update generation number of the given server node.

11. The article of manufacture of claim 10, wherein:
  the program code for modifying the set of management objects comprises program code for creating a new management object; and
  the program code for updating the set of container objects comprises:
    program code for obtaining a container object;
    program code for setting a value of the third attribute of the container object to a unique object identifier of the new management object;
    program code for incrementing a global generation counter to generate a new global update generation number;
    program code for setting a value of the second attribute of the container object equal to the new global update generation number; and
    program code for placing the container object in a head position of the sorted list of container objects.

12. The article of manufacture of claim 11, wherein the program code for obtaining the container object comprises:
  program code for accessing a list of free container objects to determine if a free container object is available for the new management object;
  program code for selecting a free container object from the list of free container objects, in response to determining that the free container object is available; and
  program code for creating a new container object in response to determining that no free container object is available, wherein a value of the first attribute of the new container object is set equal to a new unique identifier of the new container object.

13. The article of manufacture of claim 10, wherein:
  the program code for modifying the set of management objects comprises program code for updating an existing management object; and
  the program code for updating the set of container objects comprises:
    program code for accessing a container object which is associated with the updated management object;
    program code for incrementing a global generation counter to generate a new global update generation number;
    program code for setting a value of the second attribute of the container object equal to the new global update generation number; and
    program code for placing the container object in a head position of the sorted list of container objects.

14. The article of manufacture of claim 10, wherein:
  the program code for modifying the set of management objects comprises program code for deleting an existing management object; and
  the program code for updating the set of container objects comprises:
    program code for accessing a container object which is associated with the deleted management object;
    program code for setting a value of the third attribute of the container object to null to thereby create a new free container object;
    program code for adding the new free container object to the list of free container objects;
    program code for incrementing a global generation counter to generate a new global update generation number; and program code for setting a value of the second attribute of the new free container object equal to the new global update generation number.

15. The article of manufacture of claim 9, further comprising program code that is executable by the one or more processors to implement a method which comprises:

performing, by the management server node, a reclamation process to delete a free container object, wherein the free container object comprises a container object in which a value of the third attribute of the container object is set to null, wherein the reclamation process comprises:

comparing a value of the update generation number of the second attribute of the free container object to a last updated generation number of each server node in the network computing environment managed by the management server node; and deleting the free container object in response to determining that the update generation number of the free container object is less than or equal to the last updated generation number of each server node in the network computing environment managed by the management server node.

16. A system, comprising:

a management server node configured to manage a network computing environment comprising server nodes, wherein the management server node comprises at least one processor, and a system memory configured to store program code, wherein the program code is executable by the at least one processor to implement a control system which is configured to:

modify a set of management objects which is maintained and utilized by the management server node to manage the network computing environment comprising the server nodes;

update a set of container objects in response to modifying the set of management objects, wherein the set of container objects are configured to track changes to the set of management objects, wherein each container object comprises a first attribute to specify a unique identifier of the container object, a second attribute to specify an update generation number of the container object which is assigned in conjunction with updating of the container object, and a third attribute to specify a unique identifier of a given management object that is logically associated with the container object; and perform an object synchronization process using the updated set of container objects to synchronize a set of local objects of a given server node in the network computing environment with the set of management objects of the management server node;

wherein in performing the object synchronization process, the control system is configured to:

identify each container object having an update generation number which is greater than a last update generation number of the given server node; and send each of the identified container objects to the given server node for use by the given server node to update the set of local objects of the given server node based on the identified container objects received from the management server node.

17. The system of claim 16, wherein the network computing environment comprises a distributed storage environment, and wherein the server nodes comprise storage server nodes.

18. The system of claim 16, wherein the control system is further configured to:

update a sorted list of container objects in response to updating the set of container objects, wherein the sorted list of container objects comprises one or more container objects which are sorted according to the update generation numbers of the one or more container objects;

wherein in identifying each container object having an update generation number which is greater than a last update generation number of the given server node, the control system is configured to utilize the sorted list to identify each container object in the sorted list having an update generation number which is greater than the last update generation number of the given server node.

19. The system of claim 18, wherein:

in modifying the set of management objects, the control system is configured to create a new management object, update an existing management object, and delete an existing management object;

in updating the set of container objects, the control system is configured to, in response to a new management object being created:

obtain a container object;

set a value of the third attribute of the container object to a unique object identifier of the new management object;

increment a global generation counter to generate a new global update generation number;

set a value of the second attribute of the container object equal to the new global update generation number; and place the container object in a head position of the sorted list of container objects;

in updating the set of container objects, the control system is configured to, in response to an existing management object being updated:

access a container object which is associated with the updated management object;

increment a global generation counter to generate a new global update generation number;

set a value of the second attribute of the container object equal to the new global update generation number; and place the container object in a head position of the sorted list of container objects;

in updating the set of container objects, the control system is configured to, in response to an existing management object being deleted:

access a container object which is associated with the deleted management object;

set a value of the third attribute of the container object to null to thereby create a new free container object;

add the new free container object to the list of free container objects;

increment a global generation counter to generate a new global update generation number; and set a value of the second attribute of the new free container object equal to the new global update generation number.

20. The system of claim 16, wherein the control system is further configured to perform a reclamation process to delete a free container object, wherein the free container object comprises a container object in which a value of the third attribute of the container object is set to null, wherein in performing the reclamation process, the control system is configured to:

compare a value of the update generation number of the second attribute of the free container object to a last updated generation number of each server node in the network computing environment managed by the management server node; and delete the free container object in response to determining that the update generation number of the free container object is less than or equal to the last updated generation number of each server node in the network computing environment managed by the management server node.

* * * * *